United States Patent
Kokozidis et al.

(10) Patent No.: US 12,067,176 B2
(45) Date of Patent: Aug. 20, 2024

(54) WRITING INSTRUMENT

(71) Applicant: BIC Violex Single Member S.A., Anoixi (GR)

(72) Inventors: Michail Kokozidis, Anoixi (GR); Christos Galanis, Anoixi (GR); Panagiotis Polygerinos, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 0 days.

(21) Appl. No.: 18/181,036

(22) Filed: Mar. 9, 2023

(65) Prior Publication Data
US 2023/0288994 A1 Sep. 14, 2023

(30) Foreign Application Priority Data

Mar. 10, 2022 (EP) .................................... 22161230

(51) Int. Cl.
*G06F 3/03* (2006.01)
*G06F 3/0346* (2013.01)
(Continued)

(52) U.S. Cl.
CPC ........ *G06F 3/0346* (2013.01); *G06F 3/03545* (2013.01); *G06F 3/0383* (2013.01)

(58) Field of Classification Search
CPC .. G06F 3/0346; G06F 3/03545; G06F 3/0383; G09B 11/00; G09B 19/003; G09B 11/04; B43K 29/08; B43K 29/00
See application file for complete search history.

(56) References Cited

U.S. PATENT DOCUMENTS

| 5,215,397 A | 6/1993 | Taguchi et al. |
| 8,019,184 B2 | 9/2011 | Silverbrook et al. |

(Continued)

FOREIGN PATENT DOCUMENTS

| CN | 100395691 C | 6/2008 |
| CN | 101872260 B | 7/2013 |

(Continued)

OTHER PUBLICATIONS

Extended European Search Report issued in EP 22161230.2 issued on Aug. 12, 2022 (8 pages).
(Continued)

*Primary Examiner* — Lunyi Lao
*Assistant Examiner* — Jarurat Suteerawongsa
(74) *Attorney, Agent, or Firm* — Bookoff McAndrews, PLLC

(57) ABSTRACT

An attachment for a writing instrument, comprising a support member comprising a distal end (D) and a proximal end (P), wherein an attachment axis (A) is defined between the distal end and the proximal end, wherein the support member is configured to be attached to a writing instrument, an inertial measurement unit, wherein the inertial measurement unit is configured to measure a movement of the attachment axis (A) between a first and a second position of the attachment axis, a momentum wheel assembly, wherein the momentum wheel assembly comprises a first rotatable member coupled to a first motor, wherein the first motor is configured to apply a variable torque to the first rotatable member, and a control unit configured to actuate the first motor based on the movement of the attachment axis measured by the inertial measurement unit.

20 Claims, 5 Drawing Sheets

(51) Int. Cl.
    *G06F 3/0354*     (2013.01)
    *G06F 3/038*     (2013.01)

(56) References Cited

U.S. PATENT DOCUMENTS

| | | | |
|---|---|---|---|
| 8,254,731 | B2 | 8/2012 | Khomo |
| 8,780,040 | B2 | 7/2014 | Chuang et al. |
| 9,870,083 | B2 | 1/2018 | Hinckley et al. |
| 10,007,363 | B2 | 6/2018 | Chung et al. |
| 10,474,252 | B2 | 11/2019 | Kaempf |
| 10,990,202 | B2 | 4/2021 | Böckem |
| 2009/0183929 | A1 | 7/2009 | Zhang et al. |
| 2018/0158348 | A1* | 6/2018 | Venkataraman ....... B43K 29/10 |
| 2020/0202741 | A1 | 6/2020 | Zhong |

FOREIGN PATENT DOCUMENTS

| | | |
|---|---|---|
| CN | 103616022 A | 3/2014 |
| CN | 103019414 B | 8/2015 |
| CN | 104385808 B | 6/2016 |
| CN | 104407721 B | 12/2017 |
| CN | 108268157 A | 7/2018 |
| CN | 108749403 A | 11/2018 |
| CN | 208484439 U | 2/2019 |
| CN | 107291269 B | 3/2020 |
| CN | 112558790 A | 3/2021 |
| CN | 111746178 B | 5/2021 |
| CN | 112433628 B | 6/2021 |
| EP | 1731996 A2 | 12/2006 |
| WO | 2019075895 A1 | 4/2019 |

OTHER PUBLICATIONS

H. Garud and M. Kulkarni, "Electronically enhanced pen using Inertial Measurement Unit for handwriting recognition," 2015 International Conference on Industrial Instrumentation and Control (ICIC), Pune, India, 2015, pp. 1333-1338, doi: 10.1109/IIC.2015.7150955.

M. Muehlebach and R. D'Andrea, "Nonlinear Analysis and Control of a Reaction-Wheel-Based 3-D Inverted Pendulum," in IEEE Transactions on Control Systems Technology, vol. 25, No. 1, pp. 235-246, Jan. 2017, doi: 10.1109/TCST.2016.2549266.

J. -S. Wang, Y. -L. Hsu and J. -N. Liu, "An Inertial-Measurement-Unit-Based Pen With a Trajectory Reconstruction Algorithm and Its Applications," in IEEE Transactions on Industrial Electronics, vol. 57, No. 10, pp. 3508-3521, Oct. 2010, doi: 10.1109/TIE.2009.2038339.

Wehbi, M., Hamann, T., Barth, J., Kaempf, P., Zanca, D., Eskofier, B. (2021). Towards an IMU-based Pen Online Handwriting Recognizer. In: Lladós, J., Lopresti, D., Uchida, S. (eds) Document Analysis and Recognition—ICDAR 2021. ICDAR 2021. Lecture Notes in Computer Science(), vol. 12823. Springer, Cham. https://doi.org/10.1007/978-3-030-86334-0_19.

Yang, Ziqi, et al. "Smart Pen: Final Project for ECE5725" Copyright © Ziqi Yang & Haowen Tao, Dec. 12, 2016, available at https://courses.ece.cornell.edu/ece5990/ECE5725_Fall2016_Projects/ht398_zy259/final/main_page.html.

* cited by examiner

WRITING INSTRUMENT

CROSS-REFERENCE TO RELATED APPLICATIONS

This application claims priority from the European patent application EP22161230.2, filed on Mar. 10, 2022, the entire content of which being incorporated herein by reference.

TECHNICAL FIELD

The embodiments described in the following disclosure relate to an attachment for a writing instrument, a writing instrument, a method for assisted writing, and an associated computer program element and computer readable medium.

BACKGROUND

Learning handwriting, such as the ability to place letters and words in the correct place on a writing page is difficult. Neat handwriting requires a lot of practice from students. Untidy handwriting can be caused by temporary problems with motor skills that can be corrected by practice. Typically, handwriting education is delivered in a classroom or nursery context using conventional pens, crayons, or pencils and calligraphic exercise sheets. Teaching staff supervise students as they perform the calligraphic exercises and provide advice and intervention as required. However, different students may have unique handwriting traits and require individual assistance.

Accordingly, provision for handwriting education may be further improved.

SUMMARY

According to a first aspect, there is provided an attachment for a writing instrument. The attachment comprises a support member comprising a distal end and a proximal end. An attachment axis is defined between the distal end and the proximal end. The support member is configured to be attached to a writing instrument. The attachment comprises an inertial measurement unit configured to measure a movement of the attachment axis between a first and a second position of the attachment axis. The attachment comprises a momentum wheel assembly comprising a first rotatable member coupled to a first motor. The first motor is configured to apply a variable torque to the first rotatable member. The attachment comprises a control unit configured to actuate the first motor based on the movement of the attachment axis measured by the inertial measurement unit.

According to a second aspect, there is provided a writing instrument comprising a proximal end configured to contact a writing surface, and a distal end. The attachment according to the first aspect is removably attached to, or integrally formed with, the writing instrument.

According to a third aspect, there is provided a method for assisted writing, comprising:
 detecting, during a writing operation, one or more movements of the position of an attachment axis of an attachment according to the first aspect, when the attachment is attached to a writing instrument;
 generating one or more movement signals characterising the one or more movements;
 generating at least one correction torque to be applied to the attachment by at least the first rotatable disk based on the detected one or more one or more movement signals of the attachment axis; and
 actuating at least the first motor of the attachment to apply the correction torque to the first rotatable disk.

According to a fourth aspect, there is provided a computer program element comprising machine readable instructions which, when executed by a processor, cause the processor to perform the method according to the third aspect.

According to a fifth aspect, there is provided a computer readable medium according to the sixth aspect.

Effects of the above aspects include the following.

When learning how to write using a writing instrument, the improvement of an existing handwriting style, or learning calligraphy or drawing, may require external assistance. Accordingly, the proposed approach enables the improvement of the handwriting style of a user of the attachment described herein by gently guiding the user's fingers towards the correct direction when writing, or when performing calligraphy exercises, by delivering at least one rotational moment relative to at least one axis of a writing instrument using, for example, spinning masses. In this way, a user of the writing instrument is haptically assisted to improve their handwriting style, enabling each character to be formed in a neater or more predictable style, and thus enabling the student to learn a more legible handwriting script style. An improvement in the muscle memory of the user's fingers when using the attachment described herein eventually enables an improvement in handwriting quality without requiring the attachment. As such, one use of the attachment described herein is in an educational context, where students can receive instruction and haptic feedback on their handwriting style with less intervention from teaching staff, and in a more interactive way.

Furthermore, the described attachment enables collection of information about the motion of the writing instrument when used with a specific user (for example, rotations or accelerations when completing a specific writing exercise).

The information about the motion of writing instrument may be collected and processed either on board the attachment, in an external computing apparatus, or in a combination of both.

A computer implemented algorithm executed on electronics comprised in the writing instrument, an external computing apparatus, or a combination of both can be trained to recognize the handwriting characteristics of a user of the attachment, and to compare the recognized handwriting characteristics with stored information containing idealised character representations.

At least one rotatable member (such as a reaction wheel) is driven to produce a variable torque based on the motion of the writing instrument collected by the attachment, and the idealised character representations, for example. This induces in the fingers of the user force that functions as a haptic guidance capable of guiding the user to shape their handwriting more in line with the idealised character representations. In a specific example, three rotatable members can be used to provide improved accuracy when correcting symbols.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

DETAILED DESCRIPTION

Figure 1:
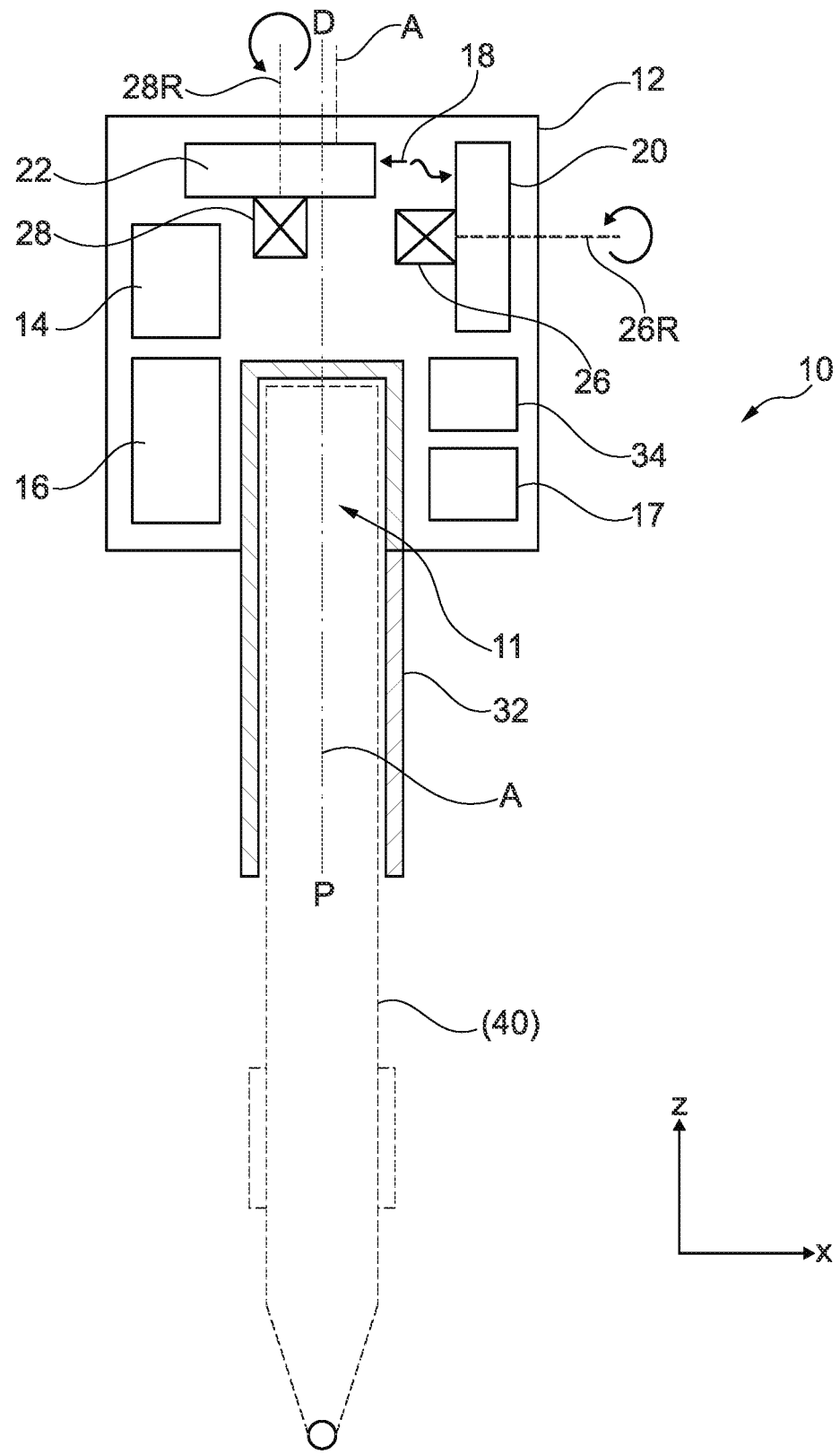
FIG. 1 shows a schematic longitudinal section of an attachment according to an example of a first aspect.

Many young students require instruction to improve their handwriting. Learning to write letters and symbols, and to put them in the right place in words and sentences, is difficult, requiring time and practice before a neat script is developed. In some cases, poor handwriting may be caused by insufficient practice or by trouble with motor skills.

In particular, handwriting require skills such as the forming of letters, the placing of letters and words on the page, making letters the right size, spacing letters, holding and controlling a writing instrument, holding paper with one hand while writing with the other hand, applying the right amount of pressure on the paper with a writing tool, using the correct arm position and posture for writing, and the like.

Handwriting difficulties can emerge for example in preschool, when children learn to grasp a drawing crayon. For some students, the difficulty persists into adulthood. Adults can often avoid having to write by hand owing to the increased use of computers and smart phone technology. However, students in school must often complete exercises by handwriting and thus the improvement of handwriting skills is desirable.

In many cases, poor handwriting can be caused by poor motor skills, such as fine motor skills. Fine motor skills include the ability to make movements using the small muscles in the human hand and wrist. Such deficiencies in motor skills may be referred to as developmental coordination disorder. Dysgraphia also refers to writing difficulties. Other challenges that are not related to motor skills can involve wider developmental variations such as impulsivity, which may cause a student to become discouraged and to rush through an assignment.

The present specification proposes an attachment 10 for rigid connection to writing instrument. The attachment 10 is capable of measuring the direction of an axis of the writing instrument. The attachment comprises at least one element for generating at least one momentum impulse in at least one direction relative to the direction of the axis of the writing instrument. Therefore, it is proposed that the attachment detects the direction of writing of the axis of the writing instrument, and generates a form of compensation torque capable of influencing the direction of the user's hand and/or fingers when writing. This haptic feedback enables a form of real-time assistance to a user of the attachment that can improve the handwriting of the user.

In general, it is proposed to generate the compensation torque in the attachment using at least one rotatable member (also termed a reaction wheel, momentum wheel, or a flywheel). In other words, a handwriting style can be improved using at least one rotatable member located inside the attachment. An inertial measurement unit 14 inside the attachment 10 senses the direction that the user is navigating the pen when writing.

A real-time computer implemented algorithm may, for example, recognize characters as they are being written, and adjust the torque applied to the at least one rotatable member to provide a dynamic angular momentum in at least one axis that can facilitate characters that are formed in an improved way. A specific example uses three rotatable members, and an inertial measurement unit that can measure the orientation of the attachment axis in three dimensions, to generate the dynamic angular momentum in three axes. This enables the correction of complex letter shapes. However, a single rotatable member may be provided to correct specific errors in one plane of motion, for example, overrunning a line on a lined page.

FIG. 1 shows a schematic longitudinal section of an attachment according to an example of a first aspect.

According to a first aspect, there is provided an attachment 10 for a writing instrument.

The attachment 40 comprises a support member 12 comprising a distal end D and a proximal end P. An attachment axis A is defined between the distal end D and the proximal end P. The support member 12 is configured to be attached to a writing instrument.

The attachment 10 comprises an inertial measurement unit 14, wherein the inertial measurement unit 14 is configured to measure a movement of the attachment axis A between a first and a second position of the attachment axis.

The attachment 10 comprises a momentum wheel assembly 18, wherein the momentum wheel assembly comprises a first rotatable member 20 coupled to a first motor 26, wherein the first motor is configured to apply a variable torque to the first rotatable member.

The attachment 10 comprises a control unit 16 configured to actuate the first motor based on the movement of the attachment axis measured by the inertial measurement unit 14.

In embodiments, the support member 12 further comprises a mounting element 32 configured to rigidly fix the attachment to a writing instrument 40.

The attachment 10 generally comprises a support member 12 that may be fitted to a writing instrument 40. The support member 12 may take the form of a housing that is fitted to any part of a writing instrument 10. In the illustration of FIG. 1, the support member 12 is fitted to the distal end D of a writing instrument 40. In this example, the support member 12 comprises a recess 11 configured to provide a rigid fit, or an interference fit, to the writing instrument 40. Accordingly, momentum exerted by user on the writing instrument 40 during use is referred to the support member 12, and correction momentum is exerted by rotatable members comprised in the attachment 10 is referred in use from the support member 12 to the body of the writing instrument 40. An attachment axis A runs from a proximal end P to a distal end D of the attachment. When fitted to a writing instrument 40, changes in the relative positioning of the attachment axis A can be measured to define the movement of the attachment 10 through free space as a user is writing using the writing instrument 40. The movements of the attachment axis A through free space may be recorded by an inertial measurement unit 14 of the attachment 10, for example.

The recess 11 of the attachment 10 may comprise a resilient or compressible material such as foam rubber enabling a rigid fit of the attachment 10 to writing instrument 40. The attachment 10 may thus be fitted to a variety of pencils, pens, and crayons. In another example, the recess 11 of the attachment 10 may be specifically formed to fit rigidly a specific type of pen intended for use in educational lessons.

In an example, the support member 12 may be fitted near to the proximal end of the writing instrument 40. The support member 12 may be substantially elongated toroid capable of being fitted anywhere along the body of the writing instrument 40, or even used as an enlarged grip of writing instrument 40. In an example, the support member 12 has a symmetrical cross section in the plane orthogonal to the attachment axis A. In another example, the shape of the support member 12 in the plane orthogonal to the attachment axis A may be irregular. In a variation, the attachment 10 is attached to a writing instrument 40 using a clip, one or more wires, or using adhesive, for example. Provided the support member 12 is capable of accommodating the elements to be described, substantially any form factor can be used.

In embodiments, the inertial measurement unit 14 is rigidly attached to the support member 12. In embodiments, the momentum wheel assembly 18 is rigidly attached to the support member 12.

In an example, the support member 12 has a cylindrical, rectangular, conical, or cubic form factor.

The support member 12 illustrated in FIG. 1 comprises an inertial measurement unit 14, control unit 16, wireless modem 34 and power source 17. The inertial measurement unit 14, the control unit 16, the wireless modem 34 and power source 17 are each electronic components, and are, in examples, mounted on the same printed circuit board (not shown). The attachment 10 illustrated in FIG. 1 comprises a first motor 26 capable of applying variable torque to a first rotatable member 20. The attachment 10 illustrated in FIG. 1 further comprises a second motor 28 capable of applying variable torque to a second rotatable member 22. The specific example of FIG. 1 also comprises a third rotatable member 24 (illustrated in FIG. 2) driven by a third motor (not illustrated). The third rotatable member 24 is not illustrated in the projections of FIGS. 1 and 2 to aid clarity.

In an embodiment, the momentum wheel assembly 18 further comprises a second rotatable member 22 coupled to a second motor 28. The second motor is configured to apply variable torque to a corresponding second 22 rotatable members.

In an embodiment, the momentum wheel assembly 18 further comprises a third rotatable member 24 coupled to a third motor. The second and third motors are configured to apply variable torques to corresponding second 22 and third 24 rotatable members.

The first rotatable member 20 rotates around a first axis of rotation 26R orthogonal to a vertical direction z of the attachment 10, in other words the first axis of rotation 26R is in the illustrated x direction of FIG. 1. The second rotatable member 22 rotates around a second axis of rotation 28R that is substantially parallel to a vertical direction z. In FIG. 1, the vertical direction z is in the same direction as a longitudinal axis of a writing instrument 40 when attached to the attachment 10. Although not shown in FIG. 1, the attachment 10 in this specific example comprises a third rotatable member 24 rotatable around a third axis of rotation 30R.

A skilled person will appreciate that in an embodiment some momentum correction effect may be applied using only one rotatable member, with the proviso that a user would have to hold the attachment 10 in a predefined orientation relative to the direction of writing.

In embodiments, one or more of the first rotatable member 20, second rotatable member 22, and third rotatable member 24 have a diameter in the range 5 mm to 25 mm. In an embodiment, the first rotatable member 20, second rotatable member 22, and third rotatable member 24 each have the same diameter. In embodiments, the first rotatable member 20, second rotatable member 22, or third rotatable member 24 comprise discs or cylinders.

In embodiments, the respective axes of rotation 26A,B,C of the first, second, and third rotatable members are orthogonal.

In embodiments, one or more of the first rotatable member 20, second rotatable member 22, and third rotatable member 24 have a mass in the range of 5 grams to 100 grams.

In embodiments, one or more of the first motor 26, second motor 28, and third motor are configured to rotate the corresponding first rotatable member 20, second rotatable member 22, and third rotatable member 24 at an angular velocity in the range 0.05 to 100.0 radians per second.

The group of rotatable members and their drive motors together form components of a momentum wheel assembly 18. The components of the momentum wheel assembly 18 are contained within the support member 12.

In an example, the total length of the attachment 10 in the longitudinal direction L is between 20 mm and 100 mm. In an example, when the writing implement 10 has a circular cross-section, the maximum diameter of the writing implement is in the range of 6 mm to 20 mm, and specifically 9 mm. The elongate body of the attachment 10 may, for example, comprise an injection molding of polycarbonate, or polypropylene.

In an example, the rotatable members are momentum wheels (such as wheels with disk-shaped masses). The at least one or more rotatable members are placed in a fixed and rigid geometric relationship to the attachment axis A of the attachment 10. The rotatable members can have equal diameter, thickness, and density. In an example, one or more of the rotatable members may have different geometrical dimensions and mechanical properties.

In an example, the first, second, and third rotatable members 20, 22, 24 are formed from solid monolithic discs. In an example, the first, second, and third rotatable members 20, 22 are hollow discs comprising internal masses. The first, second, and third rotatable members 20, 22, 24 are provided with corresponding motors 26, 28.

The motors are capable of applying a torque to the rotatable members at an angular velocity of up to 100 radians per second. In examples, the motors are brushless DC motors, servo motors, stepper motors, piezo-electric motors, ultrasonic motors, or other motors known to a person skilled in the art. An example, at least one motor is coupled to a corresponding encoder wheel enabling tachometer measurements of the motor and to provide feedback to a motor control loop operated by the control unit 16.

In an example, the motors are directly connected to the rotatable members. In another example, the motors are coupled to the rotatable members via an angled coupler, to allow the attachment to have a smaller form factor.

According to an example, the momentum wheel assembly is located within the support member 12 at, or close to, the distal end D of the support member 12.

The power source 17 is configured to provide electrical power to the electronic circuitry of the writing instrument 10. In an example, the power source 17 is an alkaline battery (such as a AAA or an AA battery), a lithium battery, a Li-ion battery, and the like. The power source 17 can be embedded in the writing instrument, and either be disposable or rechargeable.

In embodiments, the inertial measurement unit 14 is configured to measure one or more of the roll, pitch, yaw, x translation, y translation, and/or z translation of the attachment axis A. The inertial measurement unit is, in an embodiment, configured to measure any combination of the roll, pitch, yaw, x translation, y translation, and/or z translation of the attachment axis A, and or the attachment 10.

In an example, and with reference to the axes of FIG. 1, roll is a rotational force, or moment, of the attachment axis A of the support member 10 around the X axis. Pitch is a rotational force, or moment, of the attachment axis A of the support member 10 around the Y axis. Yaw is a rotational force, or moment, of the attachment axis A of the support member 10 around the Z axis.

The inertial measurement unit 14 may comprise one or more miniaturised sensors configured to sense the rotation and acceleration of the attachment 10 and thus the writing instrument 40 about the attachment axis A. In examples, the inertial measurement unit is comprised of a plurality of inertial measurement modules configured to measure the rotation and acceleration of the attachment 10 relative to the x, y, and z axes indicated in the Figures. In an example, the inertial measurement unit 14 is an integrated MEMS (micromechanical system) accelerometer capable of measuring rotation and acceleration. In the example, the inertial measurement unit 14 measures rotation and acceleration in one, two, three, four, five, or six degrees of freedom. Measurement of an increased number of degrees of freedom can improve the accuracy of the attitude estimation of the writing instrument.

In an example, the inertial measurement unit 14 is arranged inside the support member 12 approximate to the momentum wheel assembly 18.

The control unit 16 may comprise, for example, an embedded microcontroller that is communicably coupled to receive rotation and acceleration data from at least the inertial measurement unit 14. The control unit 16 comprises drive circuitry capable of defining a variable rotation speed at which each of the first motor 26, second motor 28, and a third motor should apply to the rotatable members. The control unit 16 is coupled to the power source 17 such that it can receive electrical power. The control unit 16 is communicably coupled to a wireless modem 34, enabling data transfer between the control unit 16 and an external computing apparatus 50.

In embodiments, the inertial measurement unit 14 is configured to generate a movement signal 83 characterising the movement of the attachment axis A between a first 27 and a second 29 position (or pose, or orientation) of the attachment axis, and the control unit 16 is configured to use the movement signal 83 to identify an attempt to form a predefined symbol.

In embodiments, the control unit 16 is configured to identify the attempt to form the predefined symbol by inputting the movement signal 83 into a trained model, a control loop, and/or by comparison of the movement signal 83 to a plurality of records of movement signals in a database of motion characteristics.

The control unit 16 is capable of collecting the acceleration and/or rotation data from the inertial measurement unit 14. In an example, the control unit 16 processes the acceleration and/or rotation data from the inertial measurement unit 16 and generates drive signals defining rotation speed, and/or a rotation speed as a function of time into the future, for each of the first motor 26, second motor 28, and a third motor. The drive signals are generated based on a control algorithm executed by the control unit 16 intended to identify imperfections in handwriting of a user of the attachment 10, and to correct or to improve imperfections by generating appropriate drive signals to the motors.

In an embodiment, the control unit 16 is configured to determine an appropriate, or optimum speed for each of the first, second, and third rotatable members to rotate, to produce an appropriate momentum that can cause attachment 10 to provide a handwriting correction effect, in use. In an embodiment, the control unit 16 is configured to sample the handwriting using the inertial measurement unit 14 sampling rate in the range 10 to 3000 Hz.

In an embodiment, the control algorithm executed by the control unit 16 is a control loop such as a Kalman filter. In an embodiment, the control algorithm executed by the control unit 16 is a machine learning model. The training of such a machine learning model will be discussed subsequently. In an embodiment, the control algorithm may comprise comparing a recognized character in the course of being formed with a predefined symbol database 87. A recognized predefined symbol may thus be identified, and the drive signals of the first motor 26, second motor 28, and third motor generated based on the database lookup. In an embodiment, the control algorithm is executed by the control unit 16 of the attachment 10. In an embodiment, the control unit 16 is configured to transmit acceleration and/or rotation data measured by the inertial measurement unit 14 to an external computing apparatus 50. In this case, symbol recognition operations are performed by the external computing apparatus 50. Motor drive signals are then transmitted by the external processing apparatus 50 back to the control unit 16 of the attachment 10 via the wireless modem 34.

In an embodiment, the control unit 16 is configured to recognize a predefined symbol, and to transmit the recognized predefined symbol to the external computing apparatus 50. Further symbol or word recognition operations are performed at the external computing apparatus 50. Motor drive signals are then transmitted by the external computing apparatus 50 back to the control unit 16 of the attachment 10 via the wireless modem 34.

In an embodiment, the external computing apparatus 50 is one, or more, of a smart phone, an external server, cloud server, a tablet, or personal computer.

Figure 2:
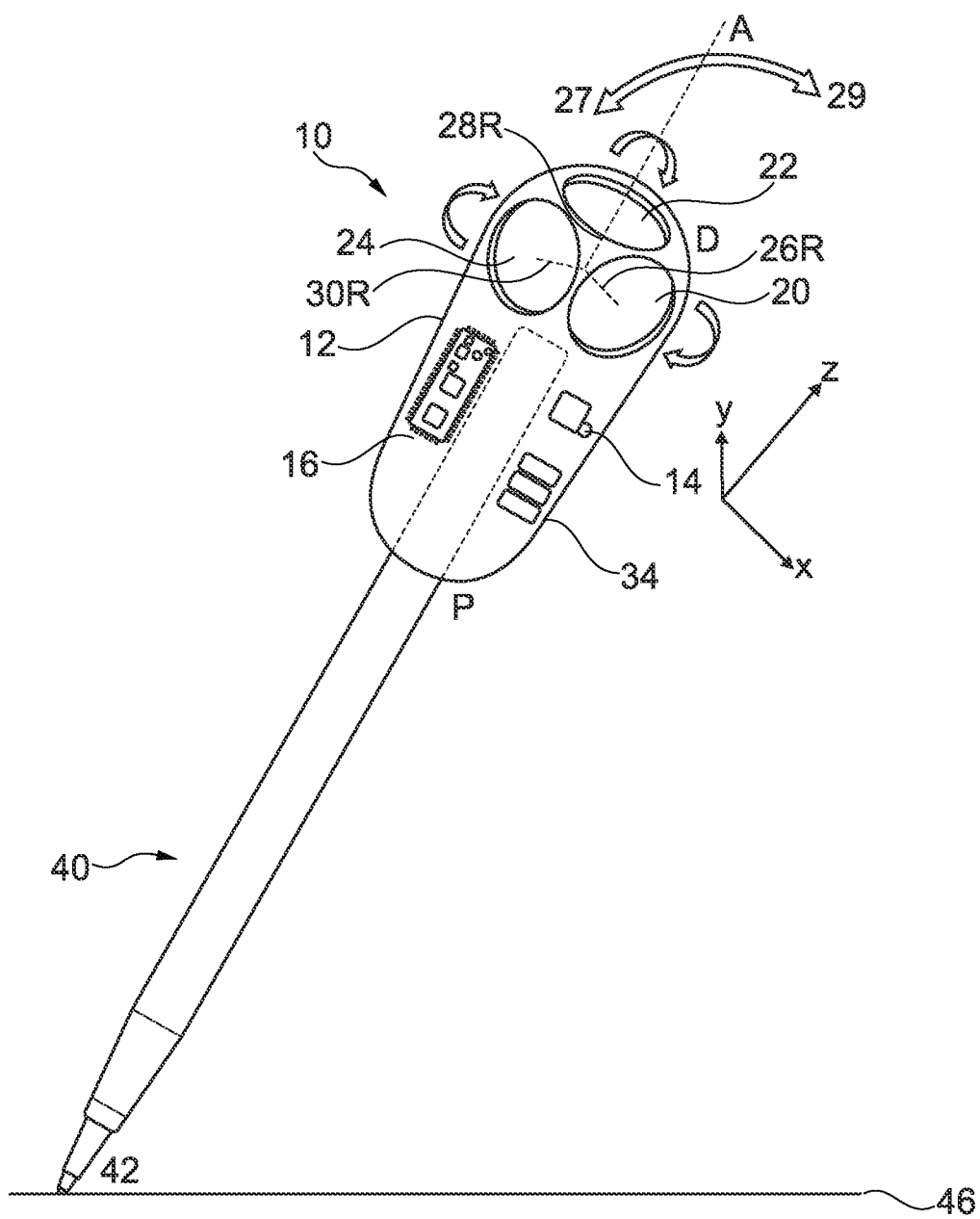
FIG. 2 shows an example of the attachment when used with a writing instrument.

FIG. 2 shows an example of the attachment 10 when used with a writing instrument 40, in a case where three rotatable members 20, 22, and 24 are present. The proximal end 42 of the writing instrument 40 is in contact with a writing surface. The attachment 10 comprises a support member 12 in the form of a substantially egg-shaped enclosure mounted to the distal and D of the writing instrument 40. To aid comprehensibility, the first motor 26, second motor 28, and third motor are not illustrated in FIG. 2. The semi-circular arrows proximate to each of the three rotatable members 20, 22, and 24 illustrate the direction of rotation of each of the respective three rotatable members 20, 22, and 24. A movement arc of the writing instrument 40 between a first position 27 and a second position 29 is also illustrated.

In embodiments, a movement of the attachment from a first position to a second position when the first rotatable member 26 is rotating about a first rotation axis 26R induces a torque on the attachment 10 in a direction perpendicular to the first rotation axis, wherein the torque is a function of the rotational momentum of the first rotatable member 26, and the direction of the movement of the attachment 10.

In embodiments, a movement of the attachment from a first position to a second position when the second rotatable member 28 is rotating about a second rotation axis 28R induces a torque on the attachment 10 in a direction perpendicular to the second rotation axis 28R, wherein the torque is a function of the rotational momentum of the second rotatable member 28, and the direction of the movement of the attachment 10.

In embodiments, a movement of the attachment from a first position to a second position when the third rotatable member is rotating about a third rotation axis 30R induces a torque on the attachment 10 in a direction perpendicular to the third rotation axis 30R, wherein the torque is a function of the rotational momentum of the third rotatable member, and the direction of the movement of the attachment 10.

Therefore, the correction momentum provided by at least the first rotatable member 26, and in a specific embodiment by a combination of the momentum from the first rotatable member 26, second rotatable member 22, and third rotatable member 24 is a consequence of torque induced precession. For example, when the first rotatable member 20 is spinning as a result of torque induced by the first motor 26, the axis of rotation 26R of the first rotatable member 20 may experience an external torque applied to it by a user of the attachment 10. As the user writes on a page during a calligraphic exercise, an external torque relative to the attachment axis A is referred to the momentum wheel assembly 18. In an example, if the speed of rotation of the first rotatable member 20 and the magnitude of the external torque are constant, the effective force applied to the first axis of rotation 26R will tend to cause the first axis of rotation 26R to move at right angles to the direction that results from the external torque alone.

This effect is generalizable to the case of an attachment comprising a second rotatable member 22, and a third rotatable member 24. Variation in the rotation speed of the rotatable members 20, 22, 24 modifies the precession effect, which is a combination of momentum components caused by the rotatable members 20, 22, 24 and referred back through the rigid body of the attachment 10 and the body of the writing instrument 40 to the hand of the student performing the calligraphy exercise. Appropriate control of the rotation speed of the rotatable members 20, 22, 24 therefore enables partial or full correction of the handwriting of the student.

Figure 3A:
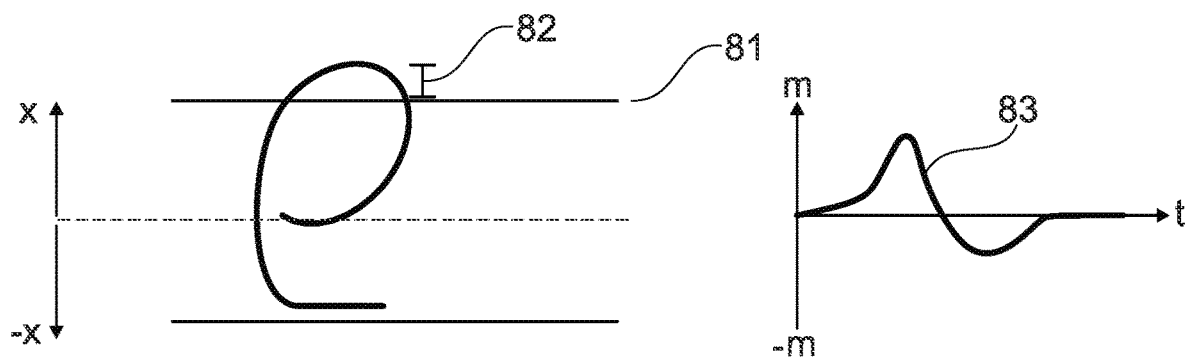
FIG. 3a schematically shows an example of an uncorrected symbol.

FIG. 3a schematically shows an example of an uncorrected symbol.

The example of FIG. 3a shows a letter "e" written onto a lined page 81 during a calligraphy exercise. The symbol is not ideally written, because a portion of the letter "e" overruns the line (positive x overrun 82). For the sake of clarity, this example will be described in terms of an attachment according to the first aspect that corrects in the x dimension only. Accordingly, such a described correction could be performed with an attachment 10 comprising a first rotatable member 20, assuming that the user of the attachment 10 takes care to align the rotation axis 26R of the first rotatable member 20 relative to the direction of intended correction (the x direction). For example, a visual direction indicator can be provided on the body of the attachment 10 to enable correct alignment of the attachment 10. In an example, an attachment 10 comprising a first rotatable member 20, a second rotatable member 22, and a third rotatable member 24 may perform an analogous correction, without requiring special alignment. In such a case, the plurality of rotatable members is actuated in such a way to provide a resultant correction along X direction, using signals from the control unit 16.

The inertial measurement unit 14 detects a movement signal 83. As the letter "e" shape is traced, a peak in the detected momentum in the x direction enables a computation that a positive overrun in the x direction of the lined page 81 has occurred. As the student traces the letter "e" shape further around and completes the character, the inertial measurement unit 14 records a negative momentum in the x direction that is not, however, indicative of a bottom-line of the lined page 81 having been overrun.

Figure 3B:
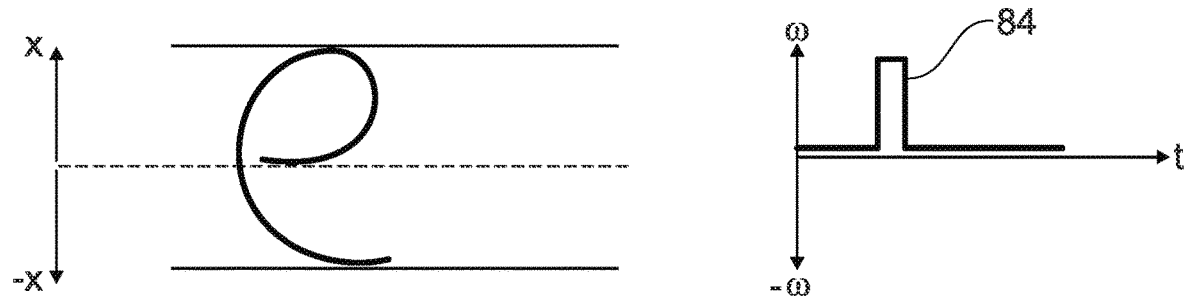
FIG. 3b schematically shows an example of corrected symbol.

FIG. 3b schematically shows an example of a corrected symbol.

The control unit 16 of the attachment, and/or an external computing apparatus 50, with which the control unit 16 is communicable coupled, generates at least an output motor speed signal 84 of a first motor 26 using the movement signal 83. The output motor speed signal 84 is designed to increase the torque applied to the writing instrument 40, and thus the hand of a user, by at least the first rotatable member 20 during subsequent letter "e" tracing exercises to thus correct the nonideal positive x direction overrun 82.

Figure 4:
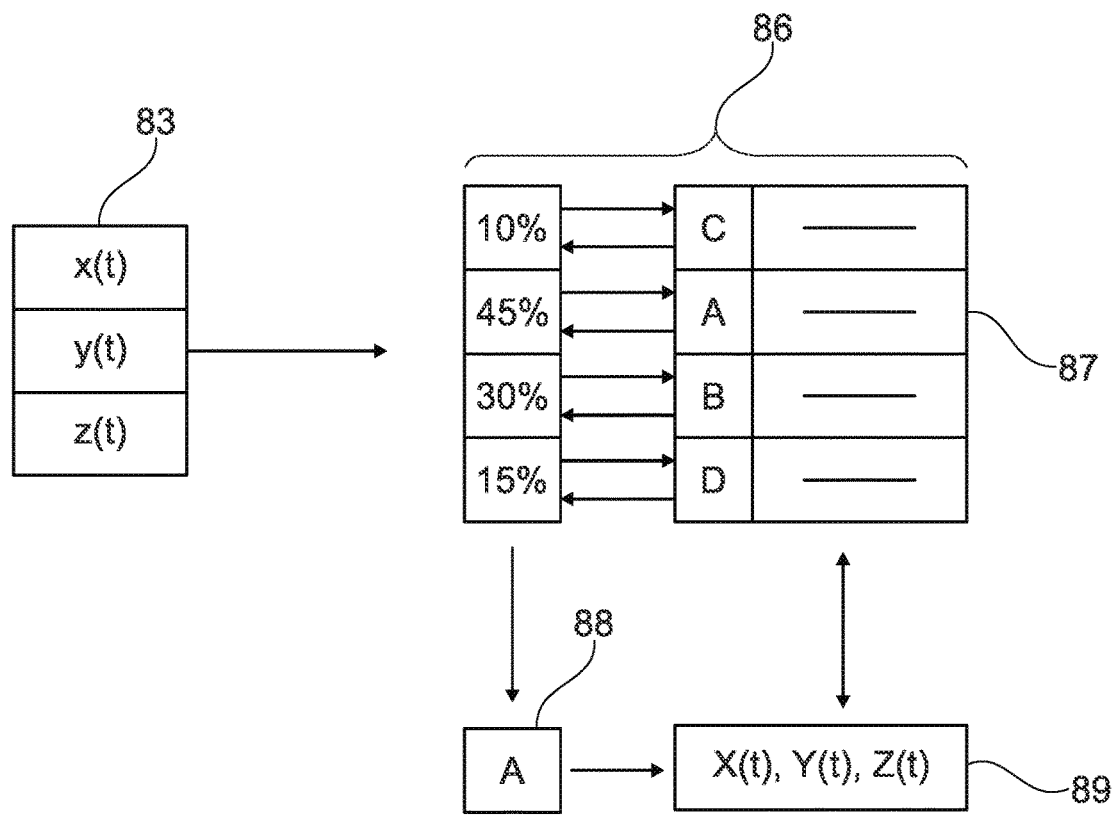
FIG. 4 schematically shows an example of recognition of a predefined symbol.

FIG. 4 schematically shows an example of recognition of a predefined symbol. This computer implemented algorithm is, in an example, performed by the control unit 16 of the attachment 10, or by an external computing apparatus 50. In particular, at least a movement signal 83 (x(t)) is obtained by the inertial measurement unit 14. The movement signal 83 defines, for example, a variation in momentum and/or rotation in the direction x. FIG. 4 also illustrates that the momentum signal can be multidimensional, including components y(t) and z(t), for example. An example of a symbol recognition process 86 involves comparing at least the movement signal 83 with records in a predefined symbol database 87. Each record of the predefined symbol database 87 comprises a field defining the symbol type (such as "C", "A", "B", D"). For each record, one or more example momentum signals characterising a corresponding symbol type are stored. In operation, the movement signal 83 is compared to each of the stored momentum signals of the predefined symbol database 87. A likelihood metric for each comparison is derived, and the momentum signal in the predefined symbol database 87 that most closely resembles the movement signal 83 is returned as the recognized predefined symbol 88.

Following identification of the recognized predefined symbol 88, one or more motor signals 89 may be obtained from the predefined symbol database or calculated in real-time. In an example, the one or more ideal motion signals 89 may be used as a position demand input to a control loop operated by the control unit 16. In other words, the next time a user of the attachment 10 attempts to form a symbol "A", the control loop operated by the control unit 16 receives momentum and rotation signals from the inertial measurement unit 14, and generates corresponding motor drive signals to drive the first, second, and third motors of the attachment 10 in a way that approximates or reaches the ideal motion signal 89.

This method of control may, for example, be used when a student is performing a repeated letter calligraphic exercise requiring copying a single letter a large number of times on a practice sheet. The control unit 16 recognizes which letter the student is trying to form, and repeatedly provides correction signals to aid muscle memory formation, for example.

Figure 5:
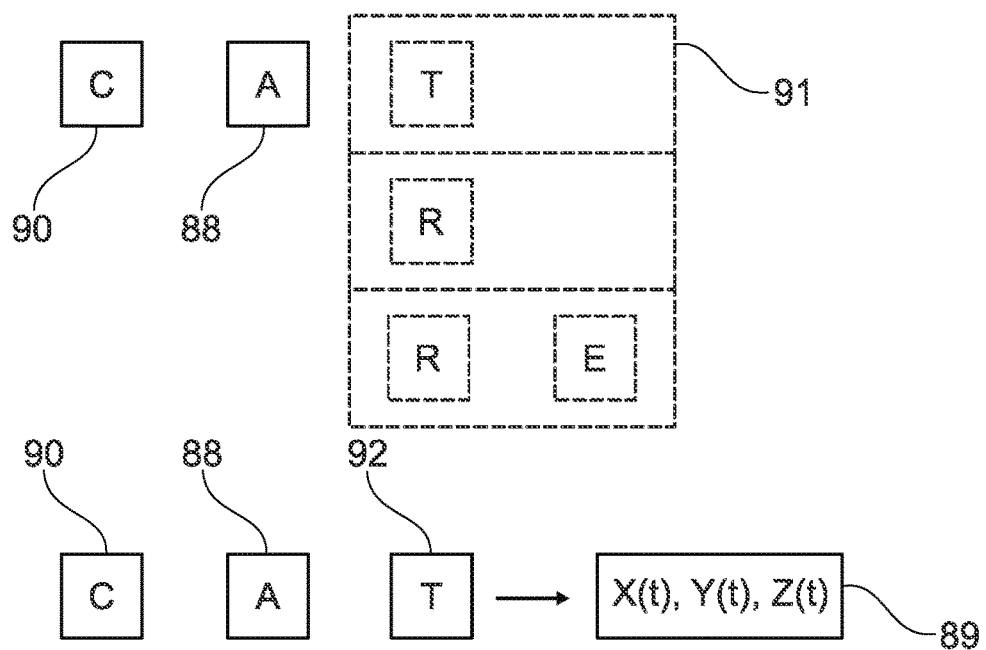
FIG. 5 schematically shows an example of motor signal generation using predicted words.

FIG. 5 schematically shows an example of motor signal generation using predicted words.

In embodiments, the control unit 16 is configured to predict a subsequent symbol that a user of the attachment will attempt to form, based on the symbol identified during the attempt to form a predefined symbol, and the control unit 16 is configured to actuate at least the first motor 26 to apply a correction torque to the attachment 10, wherein the correction torque is dependent on the subsequent symbol.

Some writing exercises involve forming distinct words according to a writing exercise sheet or writing pad, based on a limited vocabulary used in such an exercise. For example, FIG. 5 schematically illustrates a writing exercise where a student is aided to form the word "CAT". A previously recognized symbol 90 "C" and the outcome of the process of FIG. 4 (the recognized predefined symbol 88 "A") can be used as precursor information for interrogating a word completion database 91. An illustrated case, the word completion database contains a plurality of records each with at least two fields. The first of the two fields comprises a possible word stem such as "C" or "CA". As symbols are recognized based on the predefined symbol database 87, the control unit 16 and/or the external computing apparatus 50 exclude irrelevant records of the word completion database from consideration (as the word stem becomes more specific). In the illustrated case, three potentially relevant records of the word completion database 91 comprising fields comprising possible completions of the word stem "CA" are shown. In an example, the fields comprising possible completions of the word stem "CA" are ranked according to identification of a writing exercise, or writing exercise sheet, that a student is currently performing. For example, an identifier of a writing exercise sheet may be pre-programmed into the control unit 16 and/or the external computing apparatus 50 prior to beginning the writing exercise. Words that are not contained on the writing exercise sheet may be excluded, or de-prioritised, in the word completion database. In the present case, the student is performing a writing exercise involving completion of the word "CAT", and the other possible words "CAR" or "CARE" do not form part of the writing exercise. Thus, the symbol "T" is chosen as the additional letter 92.

Following identification of an appropriate word completion relative to the current writing exercise, one or more motor signals 89 may be obtained from the predefined symbol database or calculated in real-time. In an example, the one or more ideal motion signals 89 are used as a position demand input to a control loop operated by the control unit 16, enabling the attachment 10 to provide motor assistance (stimulation) when completing the word "CAT" during the exercise.

In embodiments, the attachment further comprises a wireless modem 34. The control unit 16 is configured to transmit the movement signal 83 to an external computing apparatus, and to receive a prediction of a subsequent symbol that a user of the attachment will attempt to form from the external computing apparatus 50.

For example, the wireless modem 34 is capable of communicating via Bluetooth (™), Bluetooth Low Energy (™), WiFi (™) (802.11a, b, g, n, ac, ad), Wireless USB, UMTS, LTE, ZigBee (™), and the like.

In an embodiment, the control unit 16 is configured to download from an external computing apparatus 50, one or both of a predefined symbol database 87 and/or a word completion database 91. For example, a user selects, using an interface of an external computing apparatus 50, the identity of a writing exercise. The external computing apparatus 50 then provisions memory in the control unit 16 of the attachment 10 with data comprising a predefined symbol database 87 and/or a word completion database 91 relevant to the identified writing exercise. This enables fast detection of predefined symbols or word completions using the control unit 16 of the attachment 10, without loading unnecessary data onto the control unit 16.

In embodiments, the attachment 10 is configured to communicate the recorded movement signal 83 to the external computing apparatus 50 via the wireless modem 34. The predefined symbol database 87 and/or the word completion database 91 are comprised on the memory of the external computing apparatus 50. Symbol recognition and/or word recognition operation is performed using the external computing apparatus 50. The output motor speed signal 84 is transmitted from the external computing apparatus 50 to the attachment 10. The benefit of this approach is that more complicated words requiring a higher degree of computational effort can be obtained using an external computing apparatus 50.

According to a second aspect, there is provided a writing instrument 40 comprising a proximal end 42 configured to contact a writing surface 46, and a distal end 44, wherein the attachment 10 according to the first aspect, or its embodiments, is removably attached to, or integrally formed with, the writing instrument. FIG. 2 illustrates an example of the attachment when used with a writing instrument.

Figure 6:
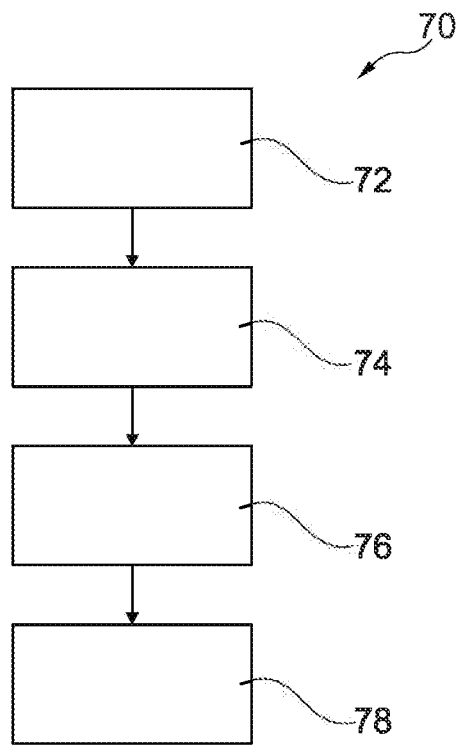
FIG. 6 schematically shows an example of a method according to the third aspect.

FIG. 6 schematically shows an example of a method according to the third aspect.

According to a third aspect, there is provided a method 70 for assisted writing, comprising:
- detecting 72, during a writing operation, one or more movements of the position of an attachment axis A of an attachment according to the first aspect, or its embodiments, when the attachment 10 is attached to a writing instrument 40;
- generating 74 one or more movement signals 83 characterising the one or more movements;
- generating 76 at least one correction torque to be applied to the attachment 10 by at least the first rotatable disk 20 based on the detected one or more one or more movement signals 83 of the attachment axis A; and
- actuating 78 at least the first motor 26 of the attachment 10 to apply the correction torque to the first rotatable disk 20.

As explained in relation to the first aspect, the attachment 10 comprises an inertial measurement unit 14 capable of detecting the one or more movements of the position of attachment axis A of the attachment 10. Accordingly, at least one correction torque to be applied to the attachment 10 by at least the first rotatable disk 20 is generated either by a database lookup, a control group, or using a trained machine learning model or the parameterised function using the detected one or more movements of the position of the attachment axis A as an input. In an embodiment, the at least one correction torque is generated by obtaining a recognized predefined symbol 88 stored in a predefined symbol database 87. In an embodiment, the at least one correction torque is generated by obtaining (predicting) an additional letter 92 from a word completion database 91.

In embodiments, the method 70 provides:
- performing a plurality of symbol formation exercises using the writing instrument 40 comprising the attachment 10 to obtain a plurality of movement signals 83 of the attachment axis A defining a training set;
- generating or adapting a model using on the training set, so that the model is configured to predict an output set comprising a plurality of predefined symbols using the plurality of motion signals of the attachment axis A each corresponding to the predefined symbols; and loading the model onto the control unit 16 of the attachment.

The control unit 16, and/or the external computing apparatus 50 can be used to receive motion signals defining intended letter pattern. For example, an instructor may manipulate a writing instrument 40 comprising the attachment 10 on an example writing exercise displaying an intended letter pattern. Alternatively, a student may manipulate the writing instrument 40 comprising attachment 10 on the example writing exercise in a slow and controlled manner, to obtain a training set of movement signals 83 that are labelled (or connected to) to predefined symbols or words.

A machine learning algorithm is then applied to the training set of movement signals 83 to generate a machine learning model. The function of the machine learning model is, given a specimen motion signal captured by the inertial measurement unit 14 of the attachment 10 as an input, to provide output signals as one or more ideal motion signals for providing a variable torque to drive one or more motors of the attachment 10. In a basic case, the machine learning model may operate in one dimension and identify that formed letters should not extend over a certain linear dimension corresponding to a line, as illustrated in FIG. 3a. In more advanced cases, the trained machine learning model is configured to provide variable torque signals to drive three motors of the attachment 10, enabling finer correction of letters and/or words during a writing exercise.

The machine learning approach applied to the training set of movement signals 83 is, for example, a deep learning algorithm or cellular neural network, a decision tree, a random forest algorithm, and others known to a skilled person.

In embodiments, the method 70 provides:
using the one or more one or more movement signals 83 to identify an attempt to form a predefined symbol by comparing the one or more movement signals 83 to (i) the model, or (ii) a control loop, or (iii) a database of motion characteristics; and predicting a subsequent symbol to be formed, based on the attempt to form the predefined symbol, wherein the correction torque is dependent on the subsequent symbol.

In further example of the use of the attachment 10, a user performs training using the attachment 10 and an intended writing instrument 40. The user describes specific characters and phrases using their own writing style. An algorithm learns to identify the motions performed for each character that the user describes, to thus provide a machine learning model. The machine learning model is loaded into the control unit 16 of the attachment 10, or into an external computing apparatus 50 that the attachment 10 is communicable coupled to via a wireless interface 34. When the user starts forming a character, the control unit 16 and/or the external computing apparatus 50 predict, using the trained model, for example via a database lookup, what the intended character might be. A variable torque is applied to one or more of the rotatable members located in the attachment 10. The rotatable members spin, and generate a moment that guides or pushes the user's fingers to perform each character.

Figure 7:
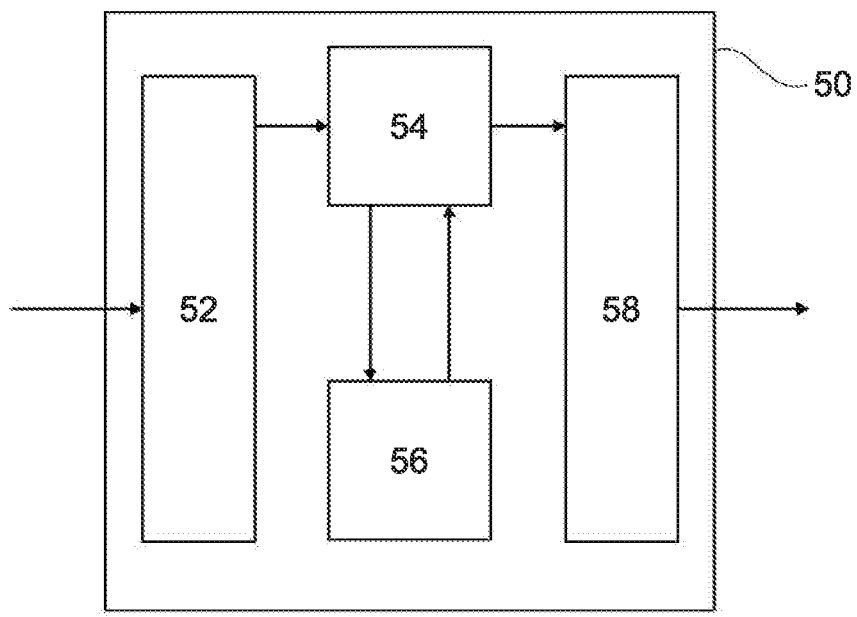
FIG. 7 schematically shows an example of an external computing apparatus.

FIG. 7 schematically shows an example of an external computing apparatus 50. The external computing apparatus 50 comprises an input interface 52 comprising a wireless modem, a processor 54, a memory 56, and an output interface 58 (the output interface 58 is also communicably coupled to the wireless modem of the external computing apparatus 50).

The input interface 52 is configured to receive from an attachment 10 according to the
first aspect, a sequence of movement signals 83, and to compare the movement signals 83 to a
predefined symbol database 87 and/or a word completion database 91 as discussed above. The
external computing apparatus 50 is further configured to transmit an ideal motion signal 89 to the attachment 10.

For example, the external computing apparatus 50 is one of a smartphone, tablet, a desktop or laptop personal computer, and the like. For example, the external computing apparatus is configured to execute the method according to the third aspect, or its embodiments.

According to a fourth aspect, a computer program element comprising machine readable instructions which, when executed by a processor, causes the processor to perform the method according to the second aspect, or its embodiments, is provided.

According to a fifth aspect, there is provided a computer readable medium according to the sixth aspect.

References throughout the preceding specification to "one embodiment", "an embodiment", "one example" or "an example", "one aspect" or "an aspect" means that a particular feature, structure, or characteristic described in connection with the embodiment or example is included in at least one embodiment of the present disclosure. Thus, appearances of the phrases "in one embodiment", "in an embodiment", "one example" or "an example", "one aspect" or "an aspect" in various places throughout this specification are not necessarily all referring to the same embodiment or example.

Furthermore, the particular features, structures, or characteristics may be combined in any suitable combinations and/or sub-combinations in one or more embodiments or examples.

| REFERENCE NUMERALS | |
|---|---|
| P | Proximal end |
| D | Distal end |
| A | Attachment axis |
| 10 | Attachment |
| 11 | Recess |
| 12 | Support member |
| 14 | Inertial measurement unit |
| 16 | Control unit |
| 17 | Power source |
| 18 | Momentum wheel assembly |
| 20 | First rotatable member |
| 22 | Second rotatable member |
| 24 | Third rotatable member |
| 26 | First motor (axis of rotation) |
| 27 | First position |
| 28 (28R) | Second motor (axis of rotation) |
| 29 | Second position |
| (30R) | Third axis of rotation |
| 32 | Mounting element |
| 34 | Wireless modem |
| 40 | Writing instrument |
| 42 | Proximal end of writing instrument |
| 44 | Distal end writing instrument |
| 46 | Writing surface |
| 50 | External computing apparatus |
| 52 | Input Interface |
| 54 | Processor |
| 56 | Memory |
| 58 | Output interface |
| 70 | Method for using an attachment |

-continued

| REFERENCE NUMERALS | |
|---|---|
| 72 | Detecting . . . |
| 74 | Generating one or more . . . |
| 76 | Generating at least one correction |
| 78 | Actuating |
| 81 | Lined page |
| 82 | Positive x overrun |
| 83 | Movement signal |
| 84 | Output motor speed signal |
| 86 | Symbol recognition process |
| 87 | Predefined symbol database |
| 88 | Recognized predefined symbol |
| 89 | Ideal motion signal |
| 90 | Previously recognized symbol |
| 91 | Word completion database |
| 92 | Additional letter |

The invention claimed is:

1. An attachment for a writing instrument, comprising:
a support member comprising a distal end (D) and a proximal end (P), wherein an attachment axis (A) is defined between the distal end and the proximal end, wherein the support member is configured to be attached to the writing instrument;
an inertial measurement unit, wherein the inertial measurement unit is configured to measure a movement of the attachment axis (A) between a first and a second position of the attachment axis (A);
a momentum wheel assembly, wherein the momentum wheel assembly comprises a first rotatable member coupled to a first motor, wherein the first motor is configured to apply a variable torque to the first rotatable member, wherein the movement of the attachment from the first position to the second position when the first rotatable member is rotating about a first rotation axis induces a torque on the attachment in a direction perpendicular to the first rotation axis, and wherein the momentum wheel assembly further comprises a second rotatable member coupled to a second motor, and a third rotatable member coupled to a third motor; and
a control unit configured to actuate the first motor based on the movement of the attachment axis (A) measured by the inertial measurement unit.

2. The attachment for the writing instrument of claim 1, wherein the torque is a function of the rotational momentum of the first rotatable member, and the direction of the movement of the attachment.

3. The attachment for the writing instrument of claim 1, wherein the second and third motors are configured to apply variable torques to corresponding second and third rotatable members.

4. The attachment for the writing instrument of claim 3, wherein respective axes of rotation of the first, second, and third rotatable members are orthogonal.

5. The attachment for the writing instrument of claim 1, wherein the inertial measurement unit is configured to measure one or more of roll, pitch, yaw, x translation, y translation, and/or z translation of the attachment axis.

6. The attachment for the writing instrument of claim 1, wherein the support member further comprises a mounting element configured to rigidly fix the attachment to the writing instrument.

7. The attachment for the writing instrument of claim 1, wherein the inertial measurement unit is configured to generate a movement signal characterising the movement of the attachment axis (A) between the first and the second position, and wherein the control unit is configured to use the movement signal to identify an attempt to form a predefined symbol.

8. The attachment for the writing instrument of claim 7, wherein the control unit is configured to identify the attempt to form the predefined symbol by inputting the movement signal into a trained model, a control loop, and/or by comparison of the movement signal to a plurality of records of movement signals in a database of motion characteristics.

9. The attachment for the writing instrument of claim 7, wherein the control unit is further configured to predict a subsequent symbol that a user of the attachment will attempt to form, based on the predefined symbol identified, and wherein the control unit is configured to actuate at least the first motor to apply a correction torque to the attachment, wherein the correction torque is dependent on the subsequent symbol.

10. The attachment for the writing instrument of claim 7, further comprising:
a wireless modem,
wherein the control unit is configured to transmit the movement signal to an external computing apparatus, and to receive a prediction of a subsequent symbol that a user of the attachment will attempt to form from the external computing apparatus.

11. A method for assisted writing for the writing instrument of claim 1, comprising:
detecting, during a writing operation, one or more movements of a position of the attachment axis (A) of the attachment, when the attachment is attached to the writing instrument;
generating one or more movement signals characterising the one or more movements;
generating at least one correction torque to be applied to the attachment by at least a first rotatable disk based on the detected one or more one or more movement signals of the attachment axis (A); and
actuating at least the first motor of the attachment to apply the correction torque to the first rotatable disk.

12. The attachment for the writing instrument of claim 1, wherein the support member comprises a recess configured to provide a rigid fit to the writing instrument.

13. The attachment for the writing instrument of claim 12, wherein the recess comprise a foam rubber for providing the rigid fit of the attachment to the writing instrument.

14. The attachment for the writing instrument of claim 1, wherein the support member comprises a power source for providing electrical power to an electronic circuitry of the writing instrument.

15. The attachment for the writing instrument of claim 1, wherein the first, second, and third rotatable members are formed of solid monolithic discs.

16. A writing instrument comprising:
a proximal end configured to contact a writing surface, and a distal end, wherein an attachment for the writing instrument is removably attached to, or integrally formed with, the writing instrument;
the attachment comprising:
a support member, wherein the support member comprises a distal end (D) and a proximal end (P), wherein an attachment axis (A) is defined between the distal end and the proximal end, wherein the support member is configured to be attached to the writing instrument, wherein
an inertial measurement unit, wherein the inertial measurement unit is configured to measure a movement of the attachment axis (A) between a first and a second position of the attachment axis (A);

a momentum wheel assembly, wherein the momentum wheel assembly comprises a first rotatable member coupled to a first motor, wherein the first motor is configured to apply a variable torque to the first rotatable member, wherein the momentum wheel assembly further comprises a second rotatable member coupled to a second motor, and a third rotatable member coupled to a third motor, and wherein the second and third motors are configured to apply variable torques to corresponding second and third rotatable members; and a control unit configured to actuate the first motor based on the movement of the attachment axis (A) measured by the inertial measurement unit.

17. The writing instrument of claim 16, wherein the movement of the attachment from the first position to the second position when the first rotatable member is rotating about a first rotation axis induces a torque on the attachment in a direction perpendicular to the first rotation axis, and wherein the torque is a function of the rotational momentum of the first rotatable member, and the direction of the movement of the attachment.

18. A method for assisted writing, comprising:

detecting, during a writing operation, one or more movements of a position of an attachment axis (A) of an attachment, when the attachment is attached to a writing instrument;

generating one or more movement signals characterising the one or more movements;

generating at least one correction torque to be applied to the attachment by at least a first rotatable disk based on the detected one or more one or more movement signals of the attachment axis (A);

actuating at least a first motor of the attachment to apply the correction torque to the first rotatable disk;

using the one or more movement signals to identify an attempt to form a predefined symbol by comparing the one or more movement signals to (i) a model, or (ii) a control loop, or (iii) a database of motion characteristics; and predicting a subsequent symbol to be formed, based on the attempt to form the predefined symbol, wherein the correction torque is dependent on the subsequent symbol.

19. The method according to claim 18, further comprising:

performing a plurality of symbol formation exercises using the writing instrument comprising the attachment to obtain a plurality of movement signals of the attachment axis (A) defining a training set;

generating or adapting a model using on the training set, so that the model is configured to predict an output set comprising a plurality of predefined symbols using a plurality of motion signals of the attachment axis (A) each corresponding to the predefined symbols; and loading the model onto a control unit of the attachment.

20. A non-transitory computer readable medium storing a computer program element comprising machine readable instructions which, when executed by a processor, cause the processor to perform the method according to claim 18.

* * * * *